United States Patent [19]

Interdonato

[11] 4,097,979

[45] Jul. 4, 1978

[54] GUIDE TOOL FOR MOUNTING VEHICLE WHEELS

[76] Inventor: Stephen R. Interdonato, 2507 N. New England Ave., Chicago, Ill. 60635

[21] Appl. No.: 824,536

[22] Filed: Aug. 15, 1977

[51] Int. Cl.² .................................................. B25B 27/14
[52] U.S. Cl. ....................................................... 29/273
[58] Field of Search ..................... 29/273, 271; 81/53.2

[56] References Cited

U.S. PATENT DOCUMENTS

| 2,640,728 | 6/1953 | Slack | 29/273 X |
| 3,843,143 | 10/1974 | Laxson | 81/53.2 |

FOREIGN PATENT DOCUMENTS

| 161,353 | 2/1955 | Australia | 29/273 |
| 627,914 | 6/1927 | France | 29/273 |

*Primary Examiner*—James L. Jones, Jr.
*Attorney, Agent, or Firm*—Vogel, Dithmar, Stotland, Stratman & Levy

[57] ABSTRACT

A guide tool to assist in mounting and dismounting an automobile wheel on the hub mounting studs therefor includes an elongated hollow tubular body internally threaded at the ends thereof with different diameter threads for threaded engagement with either of two different size wheel studs. The outer surface of the body is cylindrical and dimensioned to be received through the stud holes of the wheel for guiding the wheel onto and off of the studs without sliding engagement between the wheel and the stud threads. Diametrically opposed recesses in the outer surface of the body intermediate the ends thereof provide a seat for an end wrench or the like to facilitate mounting the guide tool on or removing it from a wheel stud.

1 Claim, 4 Drawing Figures

GUIDE TOOL FOR MOUNTING VEHICLE WHEELS

BACKGROUND OF THE INVENTION AND PRIOR ART STATEMENT

The present invention relates to guide tools to assist in mounting and dismounting the wheels of automobiles or other automotive vehicles on the mounting studs of the axle hubs.

It is well known that the wheels and tires of automobiles are relatively heavy and the task of mounting a wheel on the vehicle stud bolts can be difficult in that the stud bolts are obscured by the wheel and the wheel must be held off the ground and rotated on the hub until the stud bolts are centered with the stud holes in the wheel. Furthermore, the movement of the heavy wheel onto or off of the studs can cause scoring of the stud holes in the wheel and/or deformation of the stud threads, with the result that it is difficult or impossible to properly center the wheel on the studs, or it is difficult to thread the locking nuts onto the studs. This is particularly true with custom, specialty, wire and MAG-type wheels.

Centering or guide tools for vehicle wheels are known in the prior art. Specifically, applicant is aware of the following prior art references which are relevant to this application, and copies of which references are submitted with this application. The Baker U.S. Pat. No. 1,815,821 and the Cahill U.S. Pat. No. 3,670,391 disclose guide or pilot pins having externally threaded ends for threaded engagement in bolt holes on brake drums, as in some foreign cars and old cars of United States manufacture. They are not usable with present-day American car wheels having mounting studs or bolts on the axle hubs or brake drums.

The Freet U.S. Pat. No. 3,364,558 discloses a wheel-mounting tool having a shaft and sleeve receivable through a stud hole in the wheel with the shaft resting on the end of an associated stud. This device is inconvenient since it does not provide a firm mounting of the tool on the stud and the wheel must be lifted along with the tool to place the tool in position on the stud.

The Kayfetz U.S. Pat. No. 2,499,758 discloses a wheel mounting tool including an internally threaded sleeve receivable over the stud and an elongated hinged rod being receivable through a stud hole in the wheel and then threadedly engaged in the sleeve. But this is a complex multi-part device.

The Jamieson U.S. Pat. No. 2,708,712 discloses an illuminated wheel mounting guide which is threadedly received onto a wheel stud.

All of these prior art devices must be manually threaded into place on the stud, which may be quite difficult if the stud threads have already been damaged in previous wheel mounting operations, and all of these prior art devices are usable with only a single size of wheel stud.

SUMMARY OF THE INVENTION

The present invention is directed to an improved and simplified guide tool for mounting or dismounting vehicle wheels, which is of compact size and is of economical construction.

It is an important feature of the present invention that the guide tool is provided with external recessed surfaces for accommodating an end wrench or the like to facilitate threading the guide tool onto the wheel stud.

It is another important feature of this invention that the guide tool is internally threaded at both ends thereof with different diameter threads for use with two different size wheel studs.

Still another feature of this invention is that the guide tool is of integral one-piece construction for simplicity of manufacture and operation.

These features are attained, and it is an important object of the present invention to obtain these advantages by providing a guide tool for use in guiding a wheel stud hole of an automotive vehicle wheel over the mounting studs of the associated vehicle hub, the guide tool comprising an elongated hollow tubular body having a cylindrical outer surface dimensioned to be received through a stud hole of an associated wheel, the body being internally threaded at one end thereof for threaded engagement with a stud on the associated hub for mounting thereon, and diametrically opposed flat rectangular recesses in the outer surface of the body for accommodating an end wrench or the like, the body when mounted on an associated stud being receivable through a wheel stud hole for guiding the wheel onto or off of the stud substantially without sliding engagement therebetween.

Further features of the invention pertain to the particular arrangement of the parts of the guide tool whereby the above-outlined and additional operating features thereof are attained.

The invention, both as to its organization and method of operation, together with further objects and advantages thereof, will best be understood by reference to the following specification taken in connection with the accompanying drawings.

DESCRIPTION OF THE PREFERRED EMBODIMENT

Figure 1:
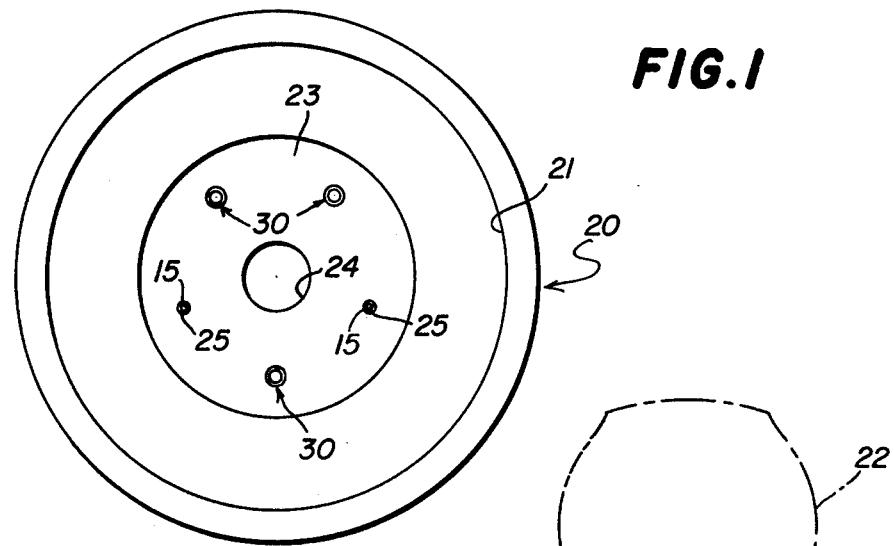
FIG. 1 is a side elevational view of a vehicle wheel mounted in place on three guide tools constructed in accordance with and embodying the features of the present invention and mounted in place on the wheel studs.

Referring now more particularly to FIGS. 1 through 4 of the drawings, there is illustrated a guide tool, generally designated by the numeral 30, constructed in accordance with the present invention and adapted for use on the brake drum or hub 10 of an automotive vehicle to facilitate the mounting thereon or dismounting therefrom of a wheel 20. The brake drum 10 is provided with a plurality of externally threaded studs or bolts 15 equiangularly spaced therearound and projecting outwardly therefrom parallel to the axis thereof in a well-known manner. Most automobiles are provided with four or five of the studs 15 on each hub 10.

The wheel 20 includes a pair of annular rims 21 on which is mounted a tire 22, the wheel 20 also including a generally circular central mounting plate 23 having a central circular aperture 24 therethrough for receiving therethrough the outer end of the front axle hub. Also formed in the mounting plate 23 are a plurality of equi-angularly spaced-apart stud holes 25 dimensioned and arranged for respectively receiving therethrough the studs 15 for supporting the wheel 20 on the brake drum 10. Suitable lugs (not shown) are threadedly engaged with the studs 15 securely to fasten the wheel 20 against the but 10, all in a well-known manner.

The guide tool 30 is integrally formed of a single piece of material, preferably metal, and comprises an elongated hollow tubular body 31 having an axial bore 32 extending therethrough and having a generally cylindrical outer surface 33, chamfered at the opposite ends thereof as at 34. The body 31 is dimensioned to be received through the stud holes 25 in the wheel 20, the body 31 having a length more than twice that of one of the studs 15. The axial bore 32 is internally threaded at each end thereof with threaded portions 35 and 36, which preferably have different thread diameters for threaded engagement respectively with either of two different sizes of wheel studs 15. Thus, for example, the guide tool 30 might be threaded so as to be usable with both American and foreign automobiles. Formed in the outer surface 33 of the body 31 midway between the ends thereof are two diametrically opposed, generally rectangular parallel recessed surfaces 37 and 38 for receiving a wrench such as an end wrench or the like, to facilitate turning of the guide tool 30 onto and off of an associated stud 15.

In operation for mounting a wheel, one or more of the guide tools 30 are threaded onto corresponding ones of the studs 15 of a vehicle hub 10 until the threadedly engaged end of the body 31 is spaced from the associated hub 10 by a distance only slightly greater than the thickness of the mounting plate 23 of the associated wheel 20. In order to facilitate the threading of the guide tool 30 onto the stud 15 an end wrench or other type of wrench may be engaged on the recessed surfaces 37 and 38 for added leverage, which may be necessary if the stud threads have been damaged in previous wheel mounting operations. On the standard American five-stud wheel, it is preferable that three of the guide tools 30 be utilized, as indicated in FIG. 1, to obtain optimum centering of the wheel with respect to the studs 15. It will be appreciated, however, that fewer than three of the guide tools 30 could be used and, in particular with wheels having only four studs 15, no more than two of the guide tools 30 would normally be desirable.

Figure 2:
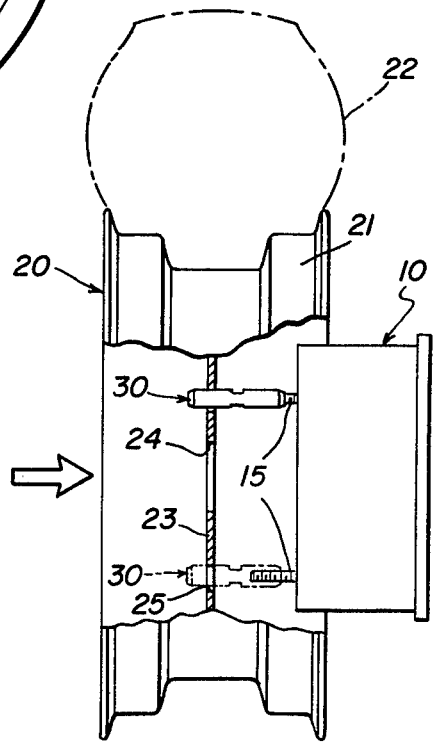
FIG. 2 is an end elevational view of the wheel of FIG. 1, with portions thereof broken away to illustrate the guide tool.
Figure 4:
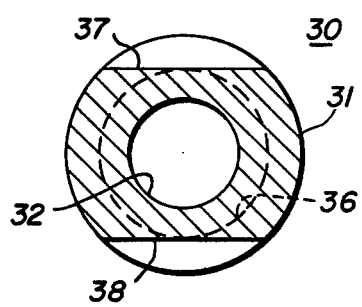
FIG. 4 is an enlarged view in vertical section taken along the line 4—4 in FIG. 3.
Figure 3:
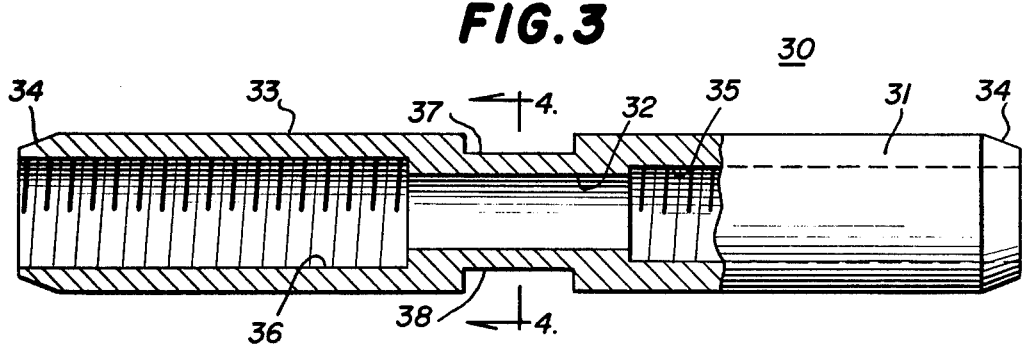
FIG. 3 is a side elevational view in partial vertical section of a guide tool constructed in accordance with and embodying the features of the present invention.

After the guide tools 30 have been mounted in place on the studs 15, the wheel 20 is fitted onto the guide tools 30, with the guide tools 30 being received through the associated ones of the stud holes 25. Preferably, the outer diameter of the body 31 is only slightly less than the diameter of the stud holes 25, so that when the wheel 20 is mounted on the guide tools 30 as illustrated in FIG. 2, the stud holes 25 will all be substantially in alignment with the associated studs 15. The wheel 20 is then slid back along the guide tools 30 and off the rear ends thereof until the mounting plate 23 rests on the threads at the base of the studs 15. Thus, the mounting plate 23 does not contact the threads of the studs 15 along the outer ends thereof during this sliding movement.

With the wheel thus positioned on the studs 15, the lugs can be threaded onto the two studs 15 which do not have the guide tools 30 mounted thereon, thereby to securely fasten the wheel 20 in place. Then, one by one, the guide tools 30 are removed, using a wrench if necessary, and replaced by lugs until all of the lugs are firmly in place.

In dismounting the wheel 20, the guide tool 30 may be used in a similar fashion. Thus, three of the lugs would be sequentially removed and replaced by guide tools 30, each guide tool being screwed into a mounted position wherein the inner end thereof is spaced from the vehicle hub 10 a distance only slightly greater than the thickness of the wheel mounting plate 23. Then, the remaining lugs are removed and the wheel is slid off the hub 10 along the guide tools 30, thereby preventing any sliding engagement between the wheel and the stud threads.

In a constructional model of the present invention, the body 31 has an overall length of approximately 4.5 inches and an outer diameter of approximately 0.635 inches; the chamfers 34 are inclined at 20° to the longitudinal axis of the body 31; each of the internal threaded portions 35 and 36 has an axial length of approximately 1.75 inches, with the threaded portion 35 being, for example, 7/16 inch-20 S.A.E. and the threaded portion 36 being ½ inch-20 S.A.E.; the recessed surfaces 37 and 38 have an axial length of ½ inch and are spaced apart approximately ½ inch; the diameter of the axial bore 32 is approximately 5/16 inch.

From the foregoing, it can be seen that there has been provided an improved guide tool for mounting vehicle wheels, the tool being of simple and economical construction and having important operating advantages.

More particularly, there has been provided an integral one-piece guide tool internally threaded with two different size threads and provided with external recessed surfaces to accommodate the use of a wrench or the like.

While there has been described what is at present considered to be the preferred embodiment of the invention, it will be understood that various modifications may be made therein, and it is intended to cover in the appended claims all such modifications as fall within the true spirit and scope of the invention.

I claim:

1. A guide tool for use in guiding the stud holes of an automobile vehicle wheel over the mounting studs of the associated vehicle hub, said guide tool comprising an elongated hollow tubular body having a smooth cylindrical outer surface extending the length thereof dimensioned to be received through a stud hole of an associated wheel and chamfered at each of the opposite ends thereof, said body having two internally threaded portions respectively at the opposite ends thereof and respectively having two different sizes of thread diameter for threaded engagement with a stud of either of said two sizes on the associated hub for mounting thereon, each of said threaded portions having a length less than the length of an associated stud and substantially greater than the distance between said threaded portions, and two diametrically opposed flat rectangular recesses in said outer surface of said body substantially midway between the opposite ends thereof for accommodating an end wrench or the like, said body when mounted on an associated stud being receivable through a wheel stud hole for guiding the wheel onto and off of the stud substantially without sliding engagement therebetween.

* * * * *